United States Patent [19]

Jennings

[11] Patent Number: 5,297,628
[45] Date of Patent: Mar. 29, 1994

[54] SIMULTANEOUS MATRIX ACIDIZING USING ACIDS WITH DIFFERENT DENSITIES

[75] Inventor: Alfred R. Jennings, Plano, Tex.

[73] Assignee: Mobil Oil Corporation, Fairfax, Va.

[21] Appl. No.: 57,132

[22] Filed: May 3, 1993

Related U.S. Application Data

[63] Continuation-in-part of Ser. No. 782,192, Oct. 24, 1991, Pat. No. 5,207,778.

[51] Int. Cl.$^5$ ...................... E21B 43/27; E21B 33/138
[52] U.S. Cl. ...................................... 166/281; 166/307
[58] Field of Search ............... 166/281, 307, 271, 269, 166/259

[56] References Cited

U.S. PATENT DOCUMENTS

| | | | |
|---|---|---|---|
| 2,850,098 | 9/1958 | Moll et al. | 166/42 |
| 3,076,762 | 2/1963 | Dill | 252/3.55 |
| 3,233,672 | 2/1966 | Carpenter | 166/42 |
| 3,354,957 | 11/1967 | Every et al. | 166/39 |
| 4,007,789 | 2/1977 | Clampitt | 166/307 |
| 4,237,974 | 12/1980 | Scherubel | 166/307 X |
| 4,787,456 | 11/1988 | Jennings, Jr. et al. | 166/281 |
| 4,842,068 | 6/1989 | Vercaemer et al. | 166/269 |
| 4,917,185 | 4/1990 | Jennings, Jr. et al. | 166/281 |
| 5,018,578 | 5/1991 | El Raba | 166/269 X |

*Primary Examiner*—Stephen J. Novosad
*Attorney, Agent, or Firm*—Alexander J. McKillop; George W. Hager, Jr.; Charles A. Malone

[57] ABSTRACT

A method for simultaneously matrix acidizing two spaced apart zones of a carbonate containing formation. Initially, a lower density acid is injected into an upper zone of said formation hereby forming wormholes which make this zone more permeable. Simultaneous with the injection of the lower density acid, a higher density acid is injected into a lower spaced apart zone of said formation at a pressure sufficient to simultaneously form wormholes within said lower zone thereby acidizing each zone simultaneously. Thereafter, a solidifiable viscous gel with gel breakers is directed into the upper and lower zones which gel enters the wormholes and forms a solid gel therein which precludes entry of additional acid while displacing the acid further into the formation. Subsequently, additional acid is introduced into the upper and lower zones which acid bypasses the wormholes containing the solid gel and penetrates substantially further thereby substantially increasing the permeability of the formation.

20 Claims, 2 Drawing Sheets

SIMULTANEOUS MATRIX ACIDIZING USING ACIDS WITH DIFFERENT DENSITIES

This invention is a continuation-in-part of application Ser. No. 07/782;192 now U.S. Pat. No. 5,207,778, which issued o May 4, 1993.

FIELD OF THE INVENTION

This invention is directed to the treatment of a subterranean carbonate formation where an acid is used in combination with a gel to improve the effectiveness of matrix acidizing in spaced apart zones or intervals.

BACKGROUND OF THE INVENTION

It is a common practice to acidize subterranean formations in order to increase the permeability thereof the petroleum industry, it is conventional to inject an acidizing fluid into a well in order to increase the permeability of a surrounding hydrocarbon-bearing formation and thus facilitate the flow of hydrocarbonaceous fluids into the well from the formation or the injection of fluids such as gas or water, from the well into the formation. Such acidizing techniques may be carried out as "matrix acidizing" procedures or as "acid-fracturing" procedures.

In acid fracturing the acidizing fluid is disposed within the well opposite the formation to be fractured. Thereafter, sufficient pressure is applied to the acidizing fluid to cause the formation to break down with the resultant production of one or more fractures therein. An increase in permeability thus is effected by the fractures formed as well as by the chemical reaction of the acid within the formation.

In matrix acidizing, the acidizing fluid is passed into the formation from the well at a pressure below the breakdown pressure of the formation. In this case, increase in permeability is effected primarily by the chemical reaction of the acid within the formation with little or no permeability increase being due to mechanical disruptions within the formation as in fracturing.

In yet another technique involving acidizing, the formation is fractured. Thereafter, an acidizing fluid is injected into the formation at fracturing pressures to extend the created fracture. The acid functions to dissolve formation materials forming the walls of the fracture, thus increasing the width and permeability thereof.

In most cases, acidizing procedures are carried out in calcareous formations such as dolomites, limestones, dolomitic sandstones, etc. One difficulty encountered in the acidizing of such a formation is presented by the rapid reaction rate of the acidizing fluid with those portions of the formation with which it first comes into contact. This is particularly serious in matrix acidizing procedures. As the acidizing fluid is forced from the well into the formation, the acid reacts rapidly with the calcareous material immediately adjacent to the well. Thus, the acid becomes spent before it penetrates into the formation a significant distance from the well. For example, in matrix acidizing of a limestone formation, it is common to achieve maximum penetration with a live acid to a depth of only a few inches to a foot from the face of the wellbore. This, of course, severely limits the increase in productivity or injectivity of the well.

In order to increase the penetration depth, it has heretofore been proposed to add a reaction inhibitor to the acidizing fluid. For example, in U.S. Pat. No. 3,233,672 issued to N. F. Carpenter, there is disclosed an acidizing process in which inhibitor, such as alkyl-substituted carboximides and alkyl-substituted sulfoxides, is added to the acidizing solution. Another technique for increasing the penetration depth of an acidizing solution is that disclosed by U.S. Pat. No. 3,076,762 issued to W. R. Dill, wherein solid, liquid, or gaseous carbon dioxide is introduced into the formation in conjunction with the acidizing solution. The carbon dioxide acts as a coolant, thus retarding the reaction rate of the acid with the formation carbonates. Also, the carbon dioxide is said to become solubilized in the acidizing solution, thus resulting in the production of carbonic acid which changes the equilibrium point of the acid-carbonate reaction to accomplish a retarding effect.

An additional procedure disclosed in U.S. Pat. No. 2,850,098 issued to Moll et al. involves the removal of contaminants from a water well and the adjacent formation through the injection of gaseous hydrogen chloride. Still another technique for acidizing a calcareous formation is disclosed in U.S. Pat. No. 3,354,957 issued to Every et al. In this process liquid anhydrous hydrogen chloride is forced from a well into the adjacent formations. The liquid hydrogen chloride vaporizes within the formation and the resulting gas dissolves in the formation to form hydrochloric acid which then attacks the formation.

From these teachings it is apparent that there are numerous limitations to present methods of matrix acidizing and diverting techniques. For example, when acid reacts in carbonates, "wormholes" are created. That is, acid reaction begins in a pore channel with little resistance. With continued exposure to acid, the wormhole takes more and more acid. In order to get the acid to a desired location, the wormhole is plugged. A diverting agent may damage the wormhole causing a decrease in the flow of hydrocarbonaceous fluids. Additionally, acid may be diverted to an undesired high permeability zone.

Another limitation is presented when acidizing multiple zones or intervals via one well that penetrates a carbonate containing formation. Wells completed through formations at multiple intervals always present a challenge for effective treatment. Frequently, various methods of zone isolation or diverting will be used in treating more than one well, especially if the zones of interest are separated by a few hundred feet. Wells which are perforated over several hundred feet in a single zone also create a challenge to treat them effectively with well stimulation such as acidizing or hydraulic fracturing.

Therefore, what is needed is a method to improve matrix acidizing of a carbonate formation having multiple spaced apart intervals or zones which takes advantage of wormhole generation while protecting existing wormholes from damage.

SUMMARY OF THE INVENTION

This invention is directed to a method for simultaneous matrix acidizing in a carbonate containing formation having multiple spaced apart intervals or zones. Initially, a lower density acid sufficient to dissolve the carbonate containing formation is introduced into an upper permeable zone via an annulus within a perforated wellbore where it forms "wormholes" which makes this zone more permeable. While injecting the lower density acid into the upper permeable zone, a higher density acid is injected by a tubing string within the wellbore into a lower spaced apart permeable zone of the formation.

Next, a solidifiable viscous gel with gel breakers therein is directed into both the upper and lower permeable zones. This gel enters the wormholes and forms a solid therein which precludes entry of additional acid while displacing the acid further into the formation. Additional acid is introduced into the upper and lower zones as previously done which acid bypasses the wormholes containing the solid gel and penetrates substantially further into the formation.

Thereafter, additional solidifiable viscous gel containing a gel breaker is introduced into both the upper and lower zones as previously done where it bypasses wormholes containing the solid gel and proceeds to displace the acids further into the formation. Subsequently, introduction of additional acid of different densities into the upper and lower zones is repeated. These acids bypass the wormholes containing the solid gel and proceed substantially further into the formation. The steps of introducing additional solidifiable viscous gel with gel breakers therein and introduction of additional acid with different densities are repeated until the formation's permeability has been substantially increased.

It is therefore an object of this invention to cause acid to contact substantially greater areas in spaced apart zones of a formation than is presently possible.

It is another object of this invention to provide for a method of simultaneous matrix acidizing of spaced apart zones in a formation by utilizing a solidifiable gel with gel breakers therein to form a solid gel in wormholes to preclude additional acid entry therein.

It is still another object of this invention to use a solid diverting agent which will liquefy so as to cause acid to be diverted further in the formation and subsequently cause the diverting agent to be removed once the gel breaks.

It is still yet another object of this invention to maintain and increase the permeability of a carbonate formation during simultaneous matrix acidizing of spaced apart zones of a formation by the use of a liquefiable solid gel.

It is yet still another object of this invention to obtain a more efficient matrix acidizing of a formation containing spaced apart zones while substantially reducing the volume of acid utilized and conducting one acidizing operation.

It is a further object of this invention to provide for a simultaneous matrix acidizing method for spaced apart carbonate zones which method does not require a mechanical packer or other zone isolation.

DESCRIPTION OF THE PREFERRED EMBODIMENTS

Figure 1:
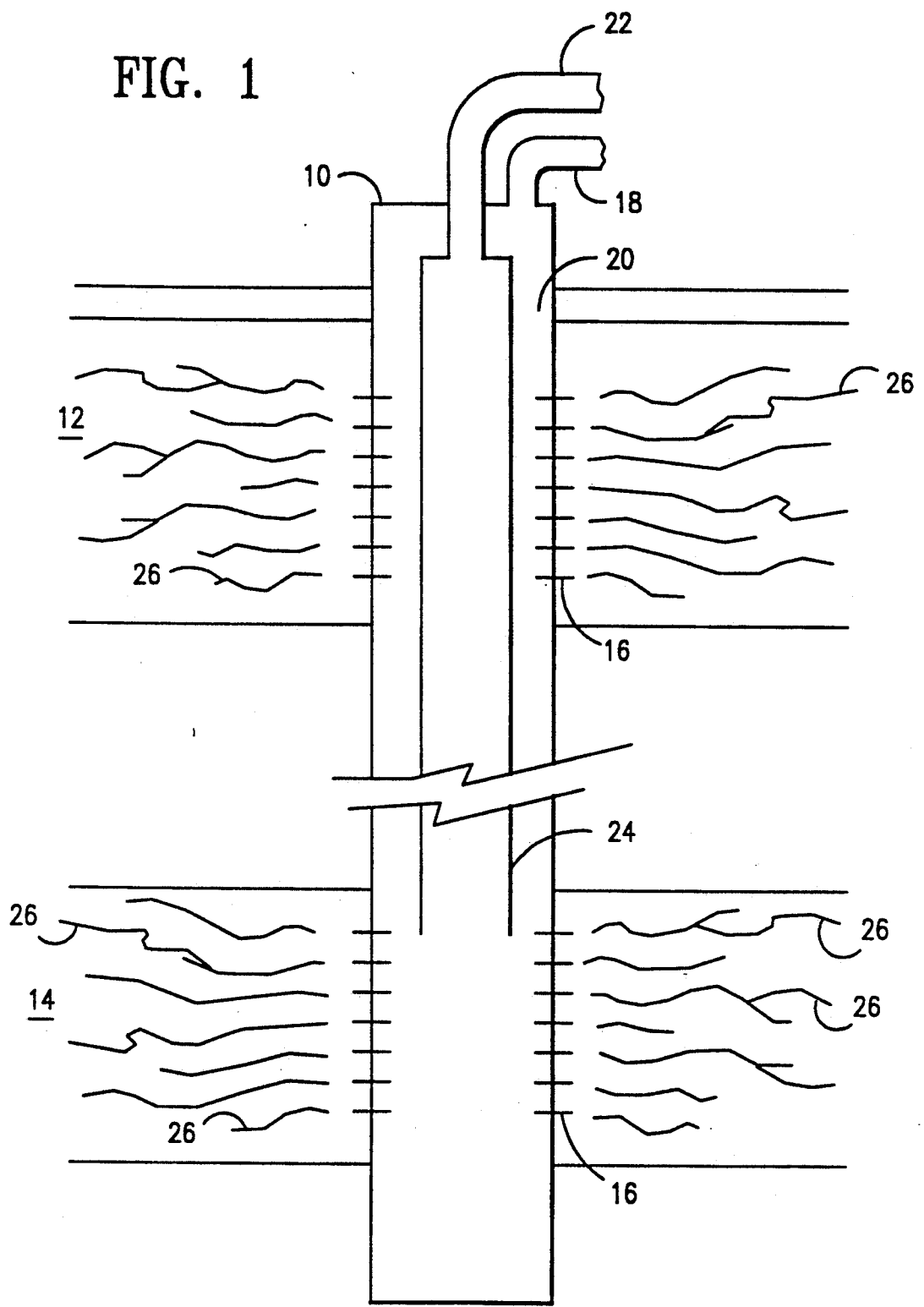
FIG. 1 is a schematic representation which shows wormholes initially being formed in a formation containing two spaced apart zones or intervals.

In the practice of this invention, referring to FIG. 1, a pore volume of an acid sufficient to etch a carbonate containing formation is introduced into wellbore 10 where it enters upper carbonate zone 12 and lower carbonate zone 14. Lower carbonate zone 14 is separated from upper carbonate zone 12 by a distance of about 50 to about 300 feet or more. Wellbore 10 communicates fluidly with upper carbonate zone 12 and lower carbonate Zone 14 by perforations 16. An annular space or annulus 20 is formed via the outside wall of wellbore 10 and tubing string 24 centrally located within the wellbore.

Tubing string 24 communicates fluidly with the surface via tubing string conduit 22. Tubing string conduit 22 communicates fluidly with an acid supply means (not shown) and a pumping means (not shown). Annulus or annular space 20 fluidly communicates to the surface via annulus conduit 18. Annulus conduit 18 is connected to an acid supply means (not shown) and a pumping means (not shown).

In order to simultaneously matrix acidize different spaced apart carbonate zones of the formation, a pore volume of an aqueous lower density acid is directed down annulus conduit 18 so as to enter upper carbonate zone 12 through perforations 16. Simultaneously a pore volume of an aqueous acid which is heavier than the lower density acid is directed into tubing string 24 via tubing string conduit 22. The heavier density acid is directed by tubing string 24 into lower carbonate interval or zone 14 via perforations 16. Aqueous lower density and higher density acids are continually directed into annulus conduit 18 and tubing string conduit 22 respectively so as to simultaneously enter upper carbonate zone 12 and lower carbonate zone 14. The rate and pressure of the acids entering upper carbonate zone 12 and lower carbonate zone 14 is at a rate and pressure insufficient to fracture either zone. Tubing string 24 is open-ended where it terminates in an area adjacent to perforations 16 in wellbore 10 within lower zone 14. The acid is injected at a pressure less than the fracturing pressure of the wellbore. Upon entering the formation the acid attacks the carbonate formation and etches channels which radiate outwardly from the well. These channels are commonly referred to as wormholes. The use of hydrochloric acid composition in matrix acidizing is disclosed in U.S. Pat. No. 4,787,456 which issued to Jennings, Jr. et al. on Nov. 29, 1988. This patent is hereby incorporated by reference herein.

Since the acid of a lower density is entering upper formation 12 at the same time that a heavier density acid is entering lower carbonate zone 14, with substantially the same injection rate and pressure without comingling of the acids, a mechanical packer is therefore not required to separate upper carbonate zone 12 from lower carbonate zone 14. Since both zones are being simultaneously acidized, only one acidizing operation need be conducted in both zones. Conducting one acidizing operation in both zones at the same time saves both time and money.

In addition to being utilized in spaced apart zones or intervals, this invention can be practiced where a single carbonate zone is encountered. This single carbonate zone will be perforated over several hundred feet. By utilizing the well configuration shown in FIGS. 1 and 2, a lower density acid can be directed in the upper portion of the carbonate zone while a lower density acid is directed into its upper portion. Introduction of the gel and additional acids is accomplished in a manner similar to that used with two spaced apart zones.

Wellbore 10 can be cased or uncased. If the wellbore is cased, the casing is cemented into wellbore 10. Thereafter, the casing is selectively perforated in a manner so that in subsequent treatments, fluids being pumped therein will pass through all perforations at a substantial rate. While the pumping rate of the hydraulic fracturing fluid is formation dependent, it should be at least about 1 to about 10 barrels per fracture. Perforations are made within wellbore 10 at a spacing of about 10 to about 100 feet apart so a desired fracture spacing can be obtained. These perforations should comprise two sets of perforations which are simultaneously formed on opposite sides of wellbore 10. Preferably, these perforations should have diameters between about ¼ to one inch. They should be placed circumferentially about the casing in the anticipated plane where it is desired to direct acid into the zone.

Acids which can be utilized should have a density differential at least in the order of about 0.5 pounds per gallon to insure that there is no commingling of the lower and higher density acids. For example, if the lower density acid is in the range of about 9.5 to about 10.0 pounds per gallon, then the higher density acid should be at least in the range of about 10.0 to 10.5 pounds per gallon.

The acid utilized may be any of the aqueous solutions of acid commonly employed for acidizing formations. For example, the acid may preferably be an aqueous solution of hydrochloric acid. Although hydrochloric acid is preferred, the following aqueous solutions of organic acids may also be utilized: formic, acetic and oxalic. When hydrochloric acid is utilized, it should be a concentration of about 5 to about 28% by weight of hydrogen chloride. The use of aqueous solutions of hydrochloric acid for acidizing subterranean formations is described in U.S. Pat. Nos. 4,787,456 and 4,917,185 to A. R. Jennings, Jr. These patents are incorporated herein by reference.

In some reservoirs, the upper and lower zones may be formed from different types of carbonate formations such as dolomite and limestone as examples. One difficulty encountered in acid fracturing of such a reservoir is the differing reaction rates of the fracturing acid with the differing dolomite and limestone zones of the reservoir with which the acid comes into contact. To overcome such a difficulty, it might be desirable to use a different acid in each of the formations. For example, in the less reactive dolomite zone a hydrochloric acid would be the preferred fracturing acid, while in the more reactive limestone zone an organic acid would be the preferred fracturing acid.

Figure 2:
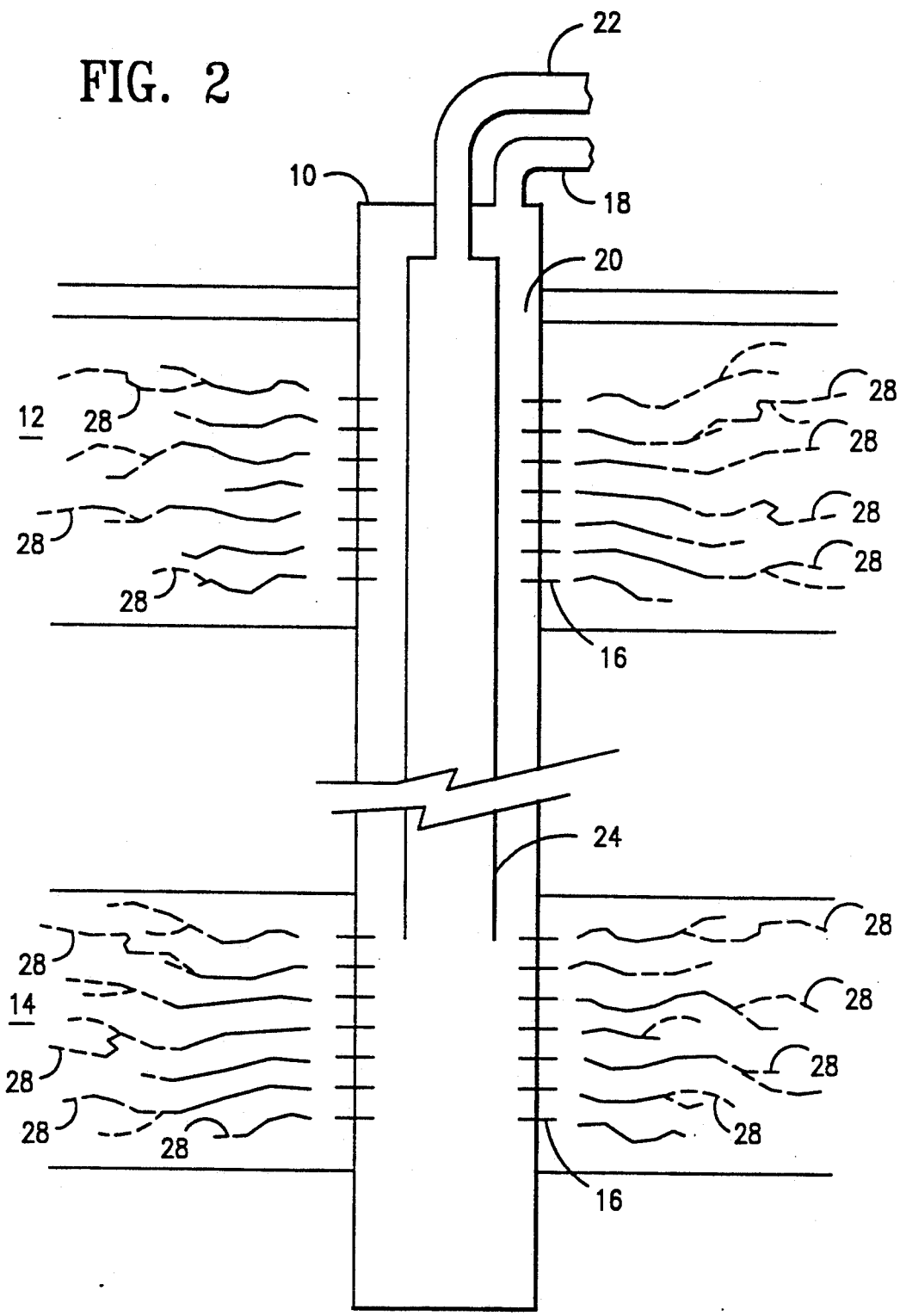
FIG. 2 is a schematic representation which depicts existing wormholes closed by a solidifiable gel which causes acid to be diverted into other areas of two spaced apart zones or intervals of the formation.

In order to obtain a greater and more diversified penetration of the acid into the formation, a solidifiable viscous gel with gel breakers therein is directed into wellbore 10 where it enters upper zone 12 and lower Zone 14 via perforations 16. As the viscous gel proceeds into the formation it enters the wormholes 26 and forms a solid gel therein. This solid gel precludes the entry of additional acid and also displaces the etching acid further into upper zone 12 and lower Zone 14. The solidifiable viscous gel is allowed to remain in these zones for a time sufficient to form a solid gel. Once a solid gel has been formed, additional lower and higher density acids are directed into upper zone 12 and lower zone 14 respectfully where they bypass wormholes 26 containing the solid gel and penetrate substantially further into the formation where additional wormholes are created and extended further into the formation. This extension of wormholes into upper zone 12 and lower zone 14 is represented in FIG. 2. Extended wormholes 28 penetrate further into the formation. Additional wormholes 26 are also created near wellbore 10.

In order to force the acid further into upper zone 12 and lower zone 14, additional solidifiable viscous gel with gel breakers therein is directed into the formation where it then pushes the acid even further into upper zone 12 and lower zone 14. As the acid proceeds into these zones, additional wormholes are created since the acid bypasses any wormholes in which the solidifiable gel has formed a solid. The steps of placing an acid into the formation and then directing a solidifiable viscous gel into the formation thereafter is continued for a time sufficient to create a desired degree of permeability into the carbonate containing zones of the formation. Once the desired degree of permeability has been obtained, acid is then placed into the formation which is followed by an "overflush" of ungelled fluid sufficient to displace the acid into the formation.

The solidifiable viscous gel which is preferred for use herein comprises a cross-linked hydroxypropyl guar (HPG) guar or a hydroxyethyl cellulose (HEC). The volume of viscous gel which is used should be at least twice the volume of the initial acid which is placed into the zones. By utilization of twice the volume of gel as that of acid in the initial stage, the gel fluid will accomplish three things.

First, it displaces a stage of reacting acid further into the formation. Second, it protects the wormholes which have been created by filling them with a cross-linked gel. Third, the gel acts as an effective diverter for the next stage of acid once it forms a solid. Each additional volume of viscous gel which follows the acid will fill any "secondary" or "tertiary" wormholes created in the upper and lower zones of the formation. Although the amount of acid utilized will vary with the carbonate formation being treated approximately 100 gallons of hydrochloric acid should be used per foot of interval or zone.

The concentration of HPG guar utilized herein or hydroxyethyl cellulose will be formation dependent and will also vary depending on the stability and the rigidity of the solidified gel which is desired to be formed in wormholes 26 and extended wormholes 28. The preferred amount of cross-linked hydroxypropyl guar (HPG) guar is in the amount of about 0.70 to about 10 weight percent of the mixture. A concentration of HPG or HEC which can be used herein is discussed in U.S. Pat. No. 4,787,456 which issued to Jennings, Jr. et al. on Nov. 29, 1988. This patent is hereby incorporated by reference herein.

The gel breakers which are incorporated into the solidifiable viscous gel can comprise enzymes or internal gel breakers. Gel breakers which can be utilized herein along with preferred concentrations are disclosed in U.S. Pat. No. 4,787,456 mentioned above. The gel breakers should be placed into the viscous gel in an amount so as to allow the complete operation to be performed prior to the gel breaking. Once the gel breaks, it flows from the formation into wellbore 10 where it is removed along with any produced hydrocarbonaceous fluids. Because the gel breaks and is removed from the formation, the formation's permeability is unaffected by the gel. Thus, the increased permeability obtained by matrix acidizing is maintained which makes for a more effective and efficient matrix acidizing operation.

Obviously, many other variations and modifications of this invention, as previously set forth, may be made

What is claimed is:

1. A method for simultaneously matrix acidizing two spaced apart zones of a carbonate containing formation comprising:
   a) injecting a lower density acid into an upper zone of said formation via an annulus of a perforated wellbore communicating with said upper zone thereby forming wormholes which make this zone more permeable;
   b) Simultaneously injecting with the lower density acid of step a), a higher density acid into a lower spaced apart zone of said formation via a tubing string within the perforated wellbore that communicates fluidly with said lower zone which acid is injected at a pressure sufficient to simultaneously form wormholes within said lower zone thereby acidizing in each simultaneously;
   c) directing a solidifiable viscous gel with gel breakers into the upper and lower zones which gel enters the wormholes and forms a solid gel therein which precludes entry of additional acid while displacing the acid further into the formation;
   d) introducing additional acid into the upper and lower zones as in steps a) and b) which acid bypasses the wormholes containing the solid gel and penetrates substantially further into the formation; and
   e) repeating steps c) and d) which displaces acid further into the formation so as to substantially increase the permeability of the formation and improve matrix acidizing.

2. The method as recited in claim 1 where the lower and upper zones are spaced about 50 to about 300 feet apart.

3. The method as recited in claim 1 wherein the density of the higher density acid is about 0.5 pounds per gallon heavier than the lower density acid.

4. The method as recited in claim 1 where the tubing string is open-ended above perforations which fluidly communicate the wellbore with said lower zone.

5. The method as recited in claim 1 where the lower and higher density acids do not co-mingle while acidizing the zones.

6. The method as recited in claim 1 where the lower and higher density acids are different acids.

7. The method as recited in claim 1 where the lower and higher density acids are different acids and are selected from a member of the group consisting of hydrochloric, formic, acetic, and oxalic acid.

8. The method as recited in claim 1 where hydrochloric acid is directed into a zone of the formation which is most reactive to an acid while an organic acid selected from a member of the group consisting of formic, acetic, or oxalic acid is directed into a less acid active reactive zone.

9. The method as recited in claim 1 where after step e) the solid gel is allowed sufficient time to break thereby opening the wormholes which allows additional hydrocarbonaceous fluids to be produced from the formation.

10. The method as recited in claim 1 where steps c) and d) are repeated until the zones have been acidized to obtain a desired permeability increase and thereafter ungelled fluid is directed into the formation.

11. A method for simultaneously matrix acidizing a carbonate containing formation comprising:
   a) injecting a lower density acid into an upper portion of said formation via an annulus of a perforated wellbore communicating with said upper portion thereby forming wormholes which make this portion more permeable;
   b) simultaneously injecting with the lower density acid of step a), a higher density acid into a lower portion of said formation via a tubing string within the perforated wellbore that communicates fluidly with said lower portion which acid is injected at a pressure sufficient to simultaneously form wormholes within said lower portion thereby acidizing in each portion simultaneously;
   c) directing a solidifiable viscous gel with gel breakers into the upper and lower portions which gel enters the wormholes and forms a solid gel therein which precludes entry of additional acid while displacing the acid further into the formation;
   d) introducing additional acid into the upper and lower portions as in steps a) and b) which acid bypasses the wormholes containing the solid gel and penetrates substantially further into the formation; and
   e) repeating steps c) and d) which displaces acid further into the formation so as to substantially increase the permeability of the formation and improve matrix acidizing.

12. The method as recited in claim 1 where the lower and upper portions are communicated with a vertical perforated wellbore for a distance of about 50 to about 300 feet.

13. The method as recited in claim 1 wherein the density of the higher density acid is about 0.5 pounds per gallon heavier than the lower density acid.

14. The method as recited in claim 1 where the tubing string is open-ended above perforations which fluidly communicate the wellbore with said lower portion.

15. The method as recited in claim 1 where the lower and higher density acids do not co-mingle while acidizing the upper and lower portions of the formation.

16. The method as recited in claim 1 where the lower and higher density acids are different acids.

17. The method as recited in claim 1 where the lower and higher density acids are different acids and are selected from a member of the group consisting of hydrochloric, formic, acetic, and oxalic acid.

18. The method as recited in claim 1 where hydrochloric acid is directed into a portion of the formation which is most reactive to an acid while an organic acid selected from a member of the group consisting of formic, acetic, or oxalic acid is directed into a less acid active reactive portion.

19. The method as recited in claim 1 where after step e) the solid gel is allowed sufficient time to break thereby opening the wormholes which allows additional hydrocarbonaceous fluids to be produced from the formation.

20. The method as recited in claim 1 where steps c) and d) are repeated until the zones have been acidized to obtain a desired permeability increase and thereafter ungelled fluid is directed into the formation.

* * * * *